March 10, 1970 W. L. VOLLINK ET AL 3,499,766
PROCESS FOR MAKING A PUFFED MULTIPHASED CEREAL PRODUCT
Filed Aug. 5, 1966 2 Sheets-Sheet 1

INVENTORS
Willard Leslie Vollink
Rudolph K Scharschmidt
BY
Le Fever, Quilleran & Hubbard
ATTORNEYS

United States Patent Office 3,499,766
Patented Mar. 10, 1970

3,499,766
PROCESS FOR MAKING A PUFFED MULTI-PHASED CEREAL PRODUCT
Willard Leslie Vollink and Rudolph K. Scharschmidt, Battle Creek, Mich., assignors to General Foods Corporation, White Plains, N.Y., a corporation of Delaware
Filed Aug. 5, 1966, Ser. No. 576,494
Int. Cl. A23l 1/18
U.S. Cl. 99—81   7 Claims

ABSTRACT OF THE DISCLOSURE

A process for making a puffed multiphased cereal or snack product having a uniform appearance by co-axially extruding at least two dissimilar dough masses through an extrusion zone wherein the pressure in said zone is gradually relieved prior to extrusion, and then puff-drying the extruded product.

---

Figure 1:
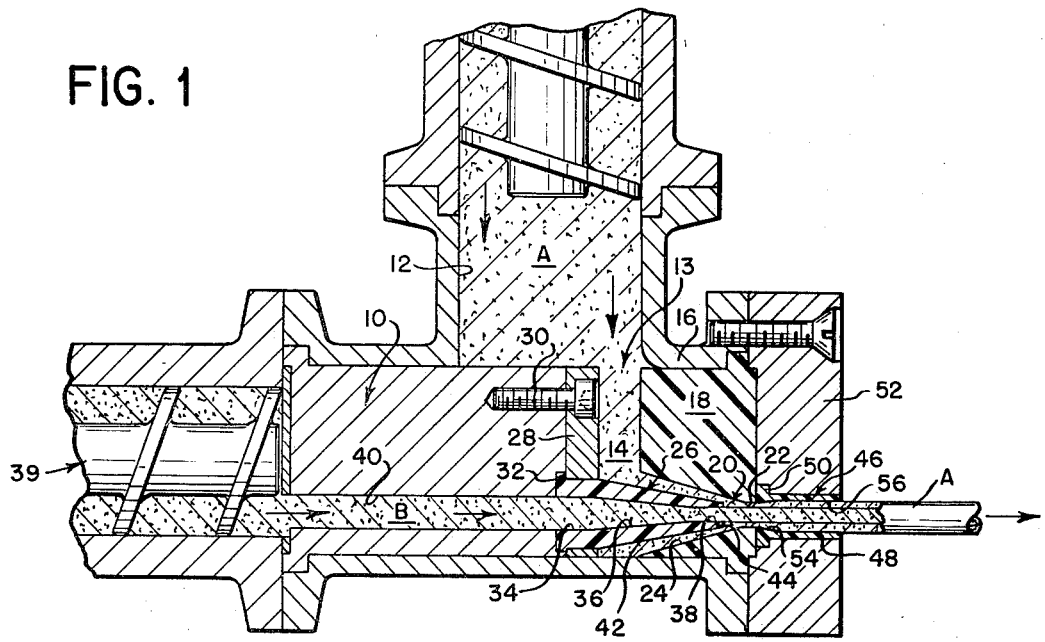

This invention relates to improvements in the art of extruding multiphase dough masses in the comestible arts. Most particularly the invention is concerned with process and apparatus whereby at least two extrudable masses are effectively united as a result of co-extrusion and are subequently converted into an edible form.

In the comestible art, typically the breakfast cereal art wherein various novel shapes offer appeal, it becomes desirable to provide a dissimilarly formulated plurality of phases which may either be dissimilarly colored or otherwise contrasted either in texture or flavor or both as well as color in order to provide consumer appeal. The uniting of these phases into a substantial contiguous relationship after processing and during packaging such that the comestible will retain its unified identity as such during packaging and distribution presents problems, which in great degree arise from failure to properly unite the phases. Thus in the breakfast cereal art it becomes desirable to convert two dissimilarly colored or flavored dough masses of an extrudable consistency to a condition whereby the extrudate will respond to subsequent mechanical handling as in the case of explosive gun puffing while retaining its identity as a unified multiphase product, i.e., the two dissimilar phases are effectively united in a form wherein they will not separate one from the other prior to consumption. Likewise, in the snack art where a ready-to-eat comestible having two distinctly dissimilar colored and/or flavored phases are united preparatory to extrusion in a form providing novel appearance and/or eating quality and wherein these two dissimilar phases will be puffed as by immersion in hot oil to cause flash of evaporation of the residual moisture of the composite, it will be desirable that the multiphase material expand in such manner as to retain a substantial degree of unity.

In such applications as are illustrated above, the attempt to create two dissimilar phases and the means employed to form the composite therefor are accompanied by collateral problems which stem from the dough characteristic of the two or more distinct phases. Thus, in the cereal dough art wherein the two dissimilar dough phases are extruded, the composition of the dough extrudate may be such as to defeat the primary object of uniting the two dissimilar phases.

Briefly stated, the present invention involves the creation of at least two dissimilar dough masses of extrudable consistency, the subjection of these dissimilar dough masses to respective extrusion pressures whereat the masses are each caused to be subjected to a pressure in excess of atmospheric incident to extrusion; uniting the two or more dissimilar dough masses under the aforestated extrusion pressures under conditions wherein relative movement between the interfaces of said masses is minimized and said phases are caused to intermingle at said interfaces under the influences of said extrusion pressures; and thence issuing the thus unified composite of dissimilar dough phases under conditions whereby the super-atmospheric extrusion pressure is relieved in a confined zone to be hereinafter described which limits the expansion due to extrusion pressure. The multiphase extrude may thereafter be subdivided by suitable cutting means into a dough composite of substantially uniform thickness and subsequently puffed by any conventional means effective to cause rapid evaporation of moisture therefrom such as atmospheric or vacuum gun puffing, hot air puffing as in a fluidized bed, or hot oil immersion puffing. The unpuffed extrudate will respond predictably and consistently to the influences of such puffing techniques without the dissimilar phases of the composite being segregated from one another. The product is eminently characterized by the facility with which the multiphase composite can be subdivided and subsequently mechanically processed into a puffed mass wherein the texture is developed incident to puffing in a controllable and desirable manner.

These product attributes are founded on the discovery that the extrusion pressures employed to unite two or more dissimilar dough phases into a composite structure preparatory to subdivision must be relieved so as to allow the interphase relationship of the dissimilar dough phases to become adjusted to one another preparatory to subdivision of the compositie structure as by a cut-off knife device moving traverse to the axis of the composite.

The process of the invention is most advantageous in that it can be adapted to the high speed production of a dual dough extrudate and the in-line sequential high speed cutting of the composite into pieces of substantially uniform thickness with a minimum of distortion. The process of the present invention can be employed in a variety of arts calling for the extrusion of a plurality of phases. Thus a cooked or uncooked starch-containing dough such as one formulated from cereal, and/or tuberous flours and most typically a cereal flour can be formulated and employed as either the outer or inner phase of a two-phase extrudate and more commonly be employed as the constituent of both such phases, the dough being hydrated to a sufficient extent to develop consistency and adhesion all of which technology is well known to those skilled-in-the-art of cereal processing.

The dough may be formulated to contain suitable colors, flavors and texture modifying ingredients which when so formulated will provide a contrast between the color, flavor and/or texture of the two or more dissimilar phases of the composite extrudate. Although a cereal dough which is cooked is preferred for most applications of the process of the present invention, any comestible dough such as one high in protein and indeed wherein a substantial level of the weight constituent of the dough mass, say 30% on a dry basis, is a protein such as dry non-fat milk solids, soy and combinations thereof may be similarly handled. In all of these applications the dough mass should be of a kneadable consistency which, when subjected to extrusion pressure will respond with shape definition and will also possess sufficient adhesion at the interfaces of the extrudate to prevent phases separation during puffing, which adhesion in the case of cereal dough is generally developed due to the hydration and at least part of the gelatinization of the starch but may also be achieved by the inclusion in the dough of binding ingredients such as sugars, proteins, gums, etc. The dough mass will also contain a level of moisture consistent with the requirements of being a shape-retaining as well as a shapeable dough, the moisture criteria being to some degree dictated by the characteristics of the dough constituents and commonly ranging in moisture content from 15 to 40%, depending upon the strength of the dough-forming constituents. For most cereal doughs which have been substantially cooked, the moisture content will range between 20 and 35%, typically in the neighborhood of 25 to 32%.

Dough moisture serves to some degree to facilitate the extrusion of the dough under conditions wherein a minimum of frictional drag is experienced. In some applications it may be desirable to employ a lubricating medium as a component of one or the other of the dough phases themselves. But in general, such lubricating medium should be used to a minimum extent.

It is an important feature of the present invention that the dough masses be so extruded through an extrusion orifice that the dough masses will be effectively united with a minimum of frictional drag relative to the shaping dies and with a high degree of extrusion turbulence at the contacting interfaces of the immediately adjacent dough phases. In general, it is a preferred feature of the present invention that the plurality of phases be caused to issue from the extrusion die forming the ultimate shape under conditions wherein there is substantially little relative movement between the two phases. Preferably integration of the two dissimilar phases will be accomplished if the two or more phases being extruded will be of substantially the same dough constituency but for the distinguishing color and/or flavoring constituents, the phases thereby displaying substantially the same dough handling and kneading characteristics incident to extrusion and thereafter. However, in some applications the doughs may be of dissimilar chemical constituency or physical state by reason of a difference in the formulation or treatment of comestibles contained therein and under such circumstances the extruding apparatus will be so designed and operated to cause extrusion under conditions wherein the extrudates will issue from the shaping dies at substantially the same rate with minimal relative movement of the dough phases.

Relative movement by the respective dough phases can be judged as minimal by persons skilled-in-the-art when the composite extrudate is subdivided and the extrusion lengths of the adjoining phases are found to be substantially comparable. Thus, in a dual extrudate wherein an internal dough phase is surrounded by an external one in a cylindrical pattern and wherein said extrudate is subdivided by a transverse cut substantially perpendicular to the longitudinal axis of said shape, the outer and inner phases will have extrusion lengths that are substantially the same. A second means to confirm that such relative movement between said dough phases is minimal is to actually subject the dry subdivided extrudate to any one of the foregoing and hereinafter described puffing operations; when relative movement between the dough phases is minimal the phases per se will not separate from one another, but rather will expand in an integral manner consistent with the relative formulation of the two phases. Of course, the constituency of one phase may be of a kind dissimilar to that of an adjoining phase and the adhesion existing between said phases may be consequently different depending upon such respective constituencies; nevertheless, when such dissimilarly formulated dough masses are puffed, they will respond to the influences of flash evaporation of moisture in such manner that the two phases will remain integrated despite differencs in the constituencies of the two phases and the relative lack of adhesion that might normally exist by reason of formulation differences therebetween prior to puffing.

Generally, the temperature of the different masses will be substantially comparable and preferably in the case of cereal doughs which have been hydrated and cooked, the doughs will be cooled to room temperature, i.e., below 100° F. prior to being charged to the extruding orifice, although it is within the spirit of the present invention that the dough may be at a super-atmospheric temperature in either or both phases, provided the dough phases respectively are integrated at the issuance from the extruding orifice under conditions whereby the two or more phases issue simultaneously and substantially at the same rate. By such extrusion practices, interphase mingling at the respective dough mass interfaces is promoted, the extrusion pressures generated preparatory to shaping the dough pieces being operative to cause extrusion turbulence in the localized surface regions of the joining phases promoting substantial integration without at the same time causing a loss of distinction between the two phases. Such localized interphase mixing can be promoted by causing turbulence to occur by suitable design of the die orifice. Thus, a male inner phase nozzle, to be hereinafter described, may be slotted at spaced points so as to further accentuate the effects of turbulence stemming from such extrusion conditions or alternatively the free end of such nozzle can be flared or restricted to achieve such turbulence.

Generally, it will be found advantageous to cause the inner phase in relationship to the next immediate outer phase to be shaped and issue into an extrudable cohesive doug mass at a point wherein the immediately adjacent and surrounding phase will be in contact with the inner phase preparatory to shaping of the outer phase. Thus, the forming die for each inner phase in relationship to the next outer phase should be located sufficiently upstream from the ultimate point of integration of the two extrudates as to provide contact and interfacial pressure between the two phases as a result of the development of extrusion pressure employed to achieve the formation of a composite. Obviously, for more than two phases this mechanical principle will be duplicated, all of which will be readily apparent from an analysis of the accompanying drawings.

Upon integration of the two phases they will thereupon be immediately caused to undergo a release of the extrusion pressure generated at least at the outermost phase of the composite. This release of extrusion pressure will be typically achieved by locating a sleeve member in coaxial relationship with the extruding die and flaring the internal surface whereby the face of the sleeve accommodates the extruding composite as it expands while containing the composite and delivering it to an extrudate cutting station. The composite extrudate will typically have a diameter in excess of ¼ inch and may range upwardly as high as 2 inches, more typically in the neighborhood of ⅜ to ¾ inch at the point of issuance from the forming die and just prior to issance to the pressure-relieving die member immediately adjacent thereto. The formed composite will expand generally less than 50% in cross-sectional dimension relative to the composite-dough dimension at the die orifice as a result of the gradual relief of extruding pressures. The degree of expansion is not critical and the foregoing figure is merely employed to serve as an illustration of the degree of expansion which is commonly encountered in gradual relief of the extrusion pressure. Generally, this expansion will be a function of the extrusion pressures which are induced by the forming die as well as the temperature of the dough piece therein and the moisture content thereof. The diameter of the terminal portion of the pressure relieving die or sleeve, however, should be sufficient to relieve substantially all extrusion pressures although some retention of extrusion pressure may stil be tolerated.

In any event, it will be essential to assure that the expansion which occurs immediately after issuance from the extruding orifice will be caused to occur within the die member therefor.

After dough expansion, the composite is then fed into any known high-speed cutting apparatus suitably designed to facilitate evenness and rapidity of cutting. It is a distinct advantage of the composite extrudate of the present invention that, even though the dough has a plurality of dissimilar phases which have been integrated and yet are identifiable and discrete from one another, the dough extrudate will be consistently and uniformly cut to the prescribed thicknesses required for subsequently puffing the product.

After cutting, the semi-moist dough mass will be handled in any conventional manner to effect a puff. For most applications, it will be preferable to reduce the moisture content of the dough pieces to a moisture content of less than 15% and more preferably under 10%, typically 6% to 8%, although in certain applications, it may be possible to effect a certain degree of puffing at moisture contents in excess of 15%, but generally less than 20%. Drying conditions preparatory to puffing are well known to those skilled-in-the-art and do not perform a feature or a critical aspect of the present invention. The criteria for air puffing, explosive gun puffing and hot oil puffing are also well known to those skilled-in-the-art.

The invention will now be more fully described by reference to an operative example.

EXAMPLE I

| Formula | Inner Phase | Outer Phase |
|---|---|---|
| Corn flour | 4.5 lb | 4.5 lb |
| Soft wheat flour | 4.5 lb | 4.5 lb |
| Pregelatinized potato flour | 1.0 lb | 1.0 lb |
| Salt | 0.3 lb | 0.3 lb |
| Sugar | 0.3 lb | 0.3 lb |
| Malt syrup | 0.4 lb | 0.4 lb |
| Water | 3.0 lb | 3.0 lb |
| Red color | 3 grams | |

A two-phase extrudate is prepared by formulating loose doughs from the ingredients specified in the foregoing tabulation. Each loose dough mass is separately cooked in a pressure cooker at 20 ps.i.g. for 30 minutes to substantially cook the compositions, whereafter they are cooled to room temperature (70° F.). In cooling, the moisture content of each of the doughs is reduced from about 30% to about 28% at which moisture content extrusion and keading characteristics as well as phase adhesion are optimum. Cool material is then fed to the dual extrusion apparatus shown in FIGS. 1 and 3. The dual extruded strands are united and shaped into a composite by passage through a ⅜ inch diameter cylindrical passage 22 in die 20 (see FIGS. 1 and 3 of the drawings) which communicates directly with pressure relief expansion die member 46 flaring outwardly to a diameter of ⁷⁄₁₆ inch, whereby the extrusion pressure is gradually relieved and the strands of composite red and cereal dough-colored material expand to ⁷⁄₁₆ inch diameter cylinder. The composite issues in a form of a rope which may be cut in any manner. Typically, the rope is cut into pieces ranging in extrusion length from 0.040″ to 0.400″, preferably 0.040″ to 0.125″ for air oven puffing and 0.05″ to 0.20″ for gun puffing. After having been dried to a moisture of about 9%, the dough piece can be gun puffed (about 7% moisture for oven puffing), and expanded to provide an integrated novel appearing piece. The expansion in the finished gun- or oven-puffed product is characterized by the development of a uniformly celled, crisp texture therein.

EXAMPLE II

| Formulation | Outside | Inside |
|---|---|---|
| (1) Raw corn flour | 32 lbs | 32 lbs |
| (2) Pregelatinized corn starch | 5 lbs. 9 oz | 5 lbs. 9 oz |
| (3) Sugar | 1 lb. 3 oz | 1 lb. 3 oz |
| (4) Salt | 1 lb. 3 oz | 1 lb. 3 oz |
| (5) 12% protein hard wheat flour | 2 lbs | 2 lbs |
| (6) Water | 15 lbs | 15 lbs |
| (7) Calcium carbonate | 150 grams | 150 grams |
| (8) Yellow color | 13 grams | 8.6 grams |
| (9) Burnt sugar color | | 13.0 grams |
| (10) Red color | | 4.5 grams |

A dual extrusion snack preparation was prepared from the foregoing formulations wherein the respective doughs were prepared by dry-blending the corn flour, the pregelatinized starch, the sugar, salt and the high protein hard wheat flour in a 60-quart Hobart bowl mixer. After mixing, a slurry of water, calcium carbonate, and colors was prepared and the slurry is poured into the dry blended ingredients and mixed and blended for additional five minutes or until homogenous. Each homogenous mix was extrusion cooked in a conventional cooker to substantially hydrate and gelatinize the starch constituents of the respective doughs, whereafter the doughs were extruded into a convenient form for handling and cooled to provide an extrudate of 28% moisture. The respective doughs were thereafter fed to the extrusion apparatus hereafter described with respect to FIGS. 1 and 3 and extruded to a strand having substantially the same dimensions as the composite extrudate of Example I, whereafter the extrusion pellet was cut to thickness which should vary from 0.10 inch to 0.15 inch, and then air-dried to moisture content of about 6–10%. The pellets were then puffed in a deep fat fryer at a temperature of 350° F. and expanded. The texture of the expanded product was uniform throughout and the respective phases were integrated with respect to one another.

The invention will now be further described with reference to the accompanying drawings.

Figure 3:
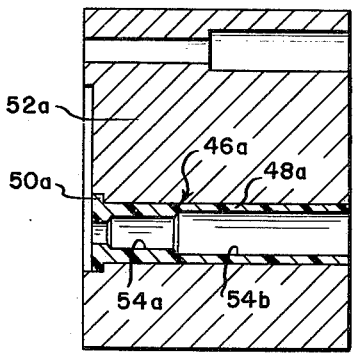
Figure 2:
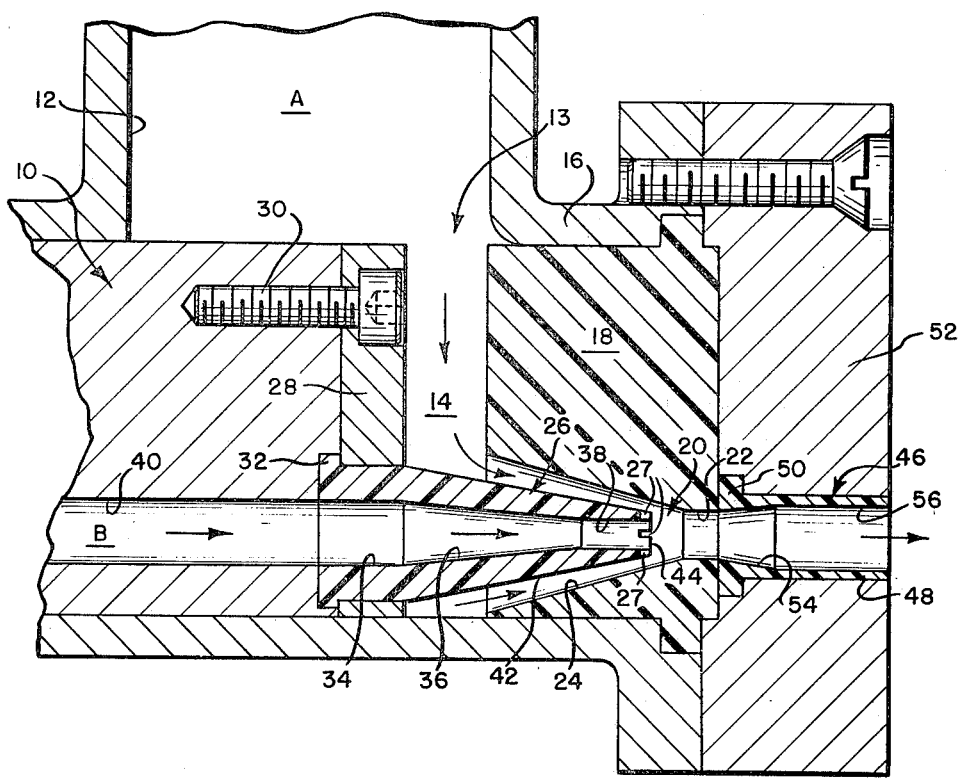

In the drawings, FIG. 1 is a cross-section in plan of a dual extruding device for use in accordance with the present invention; FIG. 2 is an enlarged cross-sectional view of an alternative form of the pressure relief device shown in FIG. 1; and FIG. 3 is a cross-sectional view of the modification of the pressure relief device shown in FIG. 1, which may be used in place of the pressure relief device shown in FIG. 2.

In the drawings, the dual extrusion device consists of a plenum chamber 10 having a cylindrical feed chamber 12 for delivering by annulus 13 of the outer dough phase shown as A to the extrusion zone generally shown at 14.

The extrusion zone is defined by cylindrical tubular section 16 having fixedly mounted therein a Teflon female die member 18 having a die orifice zone generally shown as 20 and consisting of a short cylindrical passage 22, and a frustoconical passage 24, communicating with passage 22 and adapted to receive dough from chamber 12 and zone 14.

Mounted within the confines of passage 24, is the forward part of male die member 26 mounted on plenum housing 10 by retaining ring 28 bolted at 30 and engaging the flanged shoulder region 32 of male member 26. Male die 26 has a central passage along the longitudinal axis thereof defined by cylindrical face 34, frustoconical face 36 communicating with face 34 and flaring inwardly to communicate with narrow cylindrical face 38.

Dough for the internal phase depicted as B is auger fed by suitable means shown as 39 into cylindrical extrusion chamber 40 in plenum housing 10 and is transmitted through the axial length of male member 26 so as to deliver dough at the exit end of the male member to zone 20 whereat the inner dough phase is surrounded by the outer dough phase caused to move between the outer face of male member 26 and the substantially complementary face of female die 18. Preferably, the free end of male member 26 is slotted as shown at 27 in FIG. 3 at spaced points around its cylindrical periphery whereby the dough phase B is caused to issue from the free end of the male member, not only at the circular edge thereof, but also through said slots so as to promote interphase mixing through turbulence caused by the extrusion pressure being relieved at said slotted regions of the male member, as well as the free edge thereof. As explained heretofore, such interphase mixing may be similarly promoted by shaping the free end of male member 26 in such manner as by flaring the free end outwardly or inwardly to generate a turbulent yet localized mixing action as phase B issues from male member 26 and comes into contact with other dough phase A.

The face of frustoconical passage 24 and outer face 42 of male member 26 are spaced from one another sufficiently to define the outer cereal dough phase and deliver said phase under suitable extrusion pressure and rate concomitant with the extrusion pressure and rate of delivery of the internal dough phase issuing from male member 26. As is discussed hereinabove, the relative rate of travel of the two dissimilar phases in the zone of contact thereof is such that relative movement therebetween is minimized. By assuring a minimization of relative movement between the two dissimilar phases, interphase mixing therebetween is achieved in a localized manner such that identity of respective phases is assured by effective integration thereof incident to coextrusion.

The free edge 44 of male member 26 is located a sufficient distance upstream from the cylindrical face 22 of female member 18 so as to cause the outer dough phase developed between the male and female members 26 and 18, respectively, to be brought together with radial pressure between the two phases as they pass through cylindrical opening 22 in die member 18, the terminus of the frustoconical surface 24 being sufficiently downstream of said free edge 44 to develop radial dough pressures incident to the dual extrusion of the two phases.

As seen more readily in FIG. 2, the dual extrudate passes through a pressure relieving member generally shown as 46. Pressure relief member 46 comprises a sleeve 48 having a flange 50 at one extremity thereof by which the die member 46 is mounted by retaining die plate 52. Extrusion pressure of the dual extrudate passing through cylindrical surface 22 is progressively relieved by the outwardly flaring face 54 of the pressure relief member 46. After passage through the outwardly flaring face 54, the dual extrudate enters a substantially cylindrical portion 56 of die member 46 wherein residual extrusion stresses are further relieved and redistributed, whereafter the two-phase extrudate passes from the die member in a cylindrical shape, the dual extrudate being cut upon issuance from pressure relief die member 46 by suitable knife cutting means not shown.

Referring to FIG. 2, an alternate and modified form of the pressure relief die member shown in FIGS. 1 and 3 is shown, parts in FIG. 2 corresponding to parts of FIGS. 1 and 3 being indicated by the suffix *a*, and comprising an elongated cylindrical Teflon die 46*a* having a tubular sleeve portion 48*a* retained by a flange portion 50*a* against the dual extrusion apparatus by means of die retaining block 52*a*. As seen in FIG. 2, the dual extrudate has its extrusion pressure relieved in a stepwise manner by means of a series of larger diameter cylindrical faces 54*a* and 54*b*, whereby extrusion stresses are progressively relieved and redistributed as the dual extrudate expands within pressure relief member 46*a*.

Hence, the pressure developed at the extrusion orifice between the male and female die members may be gradually relieved by the flare design shown in the modification in FIGS. 1 and 3, i.e., face 54, or by the step-wise reduction in pressure provided by the progressively larger diameter cylindrical faces 54*a* and 54*b* shown for the die member of modification in FIG. 2. Although the devices shown in the drawing are cylindrical in cross-section, they may also be of any design in cross-section, such as a square, rectangle, ellipse, and may be more intricately modified cross-sectionally, all of which will be apparent to the man-skilled-in-the-art.

What is claimed is:

1. A process for making a uniformly puffed multiphased product which comprises subjecting dissimilar edible cereal dough masses having a moisture content of about 15 to 40%, at least one of which contains starch, to respective extrusion pressures above atmospheric incident to extruding said dough masses from a first extrusion zone into a second zone; uniting said dissimilar dough masses upon extrusion thereof into the second extrusion zone while maintaining said extrusion pressure above atmospheric under conditions wherein the extrudates are in contact with one another and the relative rate of extrusion is the same, gradually relieving the pressure on said extrudates in said second extrusion zone by passing the multiphase extrudate through a confining zone which progressively increases in diameter in the direction of extrusion; extruding said multiphased product, and then puff-drying said product.

2. The process of claim 1 wherein the multiphased product is made from two dissimilar dough masses coaxially extruded.

3. The process of claim 2 wherein the multiphase extrudate is relieved of pressure while still being confined by passing the extrudate through a co-axial member of widening diameter prior to extrusion.

4. The process of claim 3 wherein said multiphased extrudate is dried to a moisture content of less than 15% and is subsequently puffed by causing rapid evaporation of residual moisture therefrom.

5. The process of claim 4 wherein said puffing is effected by gun-puffing.

6. The process of claim 4 wherein said puffing is effected by immersion in hot oil.

7. The process of claim 4 wherein said puffing is effected by hot air.

References Cited

UNITED STATES PATENTS

| | | | |
|---|---|---|---|
| 1,265,853 | 5/1918 | Wiseman | 107—1 |
| 2,125,729 | 8/1938 | Kretchmer | 107—1 |
| 2,552,290 | 5/1951 | Lilly et al. | 99—81 |
| 2,954,296 | 9/1960 | Clausi et al. | 99—82 |
| 3,104,976 | 9/1963 | Tolley | 99—86 |
| 3,131,063 | 4/1964 | Gerkens | 99—1 |
| 3,362,355 | 9/1964 | Roth | 107—1 |

RAYMOND N. JONES, Primary Examiner

U.S. Cl. X.R.

99—83